(12) United States Patent
Hrusch

(10) Patent No.: US 10,816,044 B2
(45) Date of Patent: Oct. 27, 2020

(54) ELECTROMAGNETIC SELECTABLE WEDGE CLUTCH

(71) Applicant: SCHAEFFLER TECHNOLOGIES AG & CO. KG, Herzogenaurach (DE)

(72) Inventor: Nicholas Hrusch, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 285 days.

(21) Appl. No.: 15/916,960

(22) Filed: Mar. 9, 2018

(65) Prior Publication Data

US 2019/0277351 A1    Sep. 12, 2019

(51) Int. Cl.
| | |
|---|---|
| F16D 15/00 | (2006.01) |
| F16D 41/063 | (2006.01) |
| F16D 13/18 | (2006.01) |
| F16D 41/08 | (2006.01) |
| F16D 27/02 | (2006.01) |
| F16D 27/102 | (2006.01) |
| F16D 48/06 | (2006.01) |

(52) U.S. Cl.
CPC ............ *F16D 15/00* (2013.01); *F16D 13/18* (2013.01); *F16D 27/102* (2013.01); *F16D 41/063* (2013.01); *F16D 41/082* (2013.01); *F16D 48/064* (2013.01)

(58) Field of Classification Search
CPC ...... F16D 15/00; F16D 41/063; F16D 41/082; F16D 41/10; F16D 27/02; F16D 27/102; F16D 13/18; F16D 48/064
See application file for complete search history.

(56) References Cited

U.S. PATENT DOCUMENTS

| | | | |
|---|---|---|---|
| 9,447,709 B1* | 9/2016 | Manther | F01L 1/344 |
| 2014/0014455 A1* | 1/2014 | Davis | F16D 15/00 |
| | | | 192/45.1 |
| 2016/0032988 A1* | 2/2016 | He | F16D 41/063 |
| | | | 192/45.1 |
| 2016/0290417 A1 | 10/2016 | Brubaker et al. | |
| 2016/0326918 A1* | 11/2016 | Manther | F01L 1/34409 |
| 2016/0341262 A1* | 11/2016 | Ramsey | F16D 41/063 |
| 2018/0259008 A1* | 9/2018 | Hixenbaugh | B60K 23/0808 |

* cited by examiner

Primary Examiner — Richard M Lorence
(74) Attorney, Agent, or Firm — Brooks Kushman P.C.

(57) ABSTRACT

A wedge clutch selectively locks an outer race to an inner race to transfer torque therebetween. The inner race includes a first plurality of tapered surfaces, tapered in a first direction about an axis. The inner race includes a second plurality of tapered surfaces, tapered in an opposite second direction about the axis. At least two wedge plates are provided, each having a plurality of segments with a tapered inner surface disposed on a respective one of the first or second plurality of tapered surfaces of the inner race. The tapered inner surfaces of the wedge plates are tapered in opposite directions. An electromagnetic actuator is provided for each of the wedge plates. Electrically energizing one of the actuators constricts that respective wedge plate, unwedging the wedge plate from between the inner race and outer race and to no longer inhibit relative rotation therebetween.

16 Claims, 5 Drawing Sheets

ELECTROMAGNETIC SELECTABLE WEDGE CLUTCH

TECHNICAL FIELD

The present disclosure relates to a wedge clutch for selectively coupling two or more powertrain components to each other. More specifically, the wedge clutch in this disclosure is configured to selectively operate as a one-way clutch in either or both rotational directions. In other words, the clutch can operate as follows: lock in both directions, lock rotation in one direction (freewheel in the other direction), and freewheel in both directions.

BACKGROUND

In a motor vehicle, a four-wheel drive system or an all-wheel drive system can be selectively activated by a clutch. The clutch can be part of a power transfer unit for connecting a power source to a secondary drive shaft when it is desired to deliver power to the secondary drive shaft. It is known that such a clutch can be a dog clutch. Dog clutches are prone to teeth clash or blocking. It is also known that such a clutch can be a wet clutch in a differential. Pressurized fluid must be continuously supplied to keep the clutches in a closed mode, adding to the power usage associated with usage of the clutch.

Recently, wedge clutches have been developed as a new type of clutch within the motor vehicle. In a wedge clutch, a wedge plate or wedge segments can collectively expand and contract radially to selectively couple an inner race to an outer race. Wedge clutches have been experimented with in various vehicle applications. The wedge clutch has a unique ability to save on packaging space and power consumption, which creates a need to further explore the possible applications and functionality of the wedge clutch.

SUMMARY

According to one embodiment, a wedge clutch includes an inner race having a first plurality of tapered outer surfaces tapered in a first circumferential direction, and a second plurality of tapered outer surfaces tapered in a second circumferential direction. The wedge clutch includes an outer race. The wedge clutch includes a first wedge plate located radially between the first plurality of tapered outer surfaces and the outer race, the first wedge plate having a plurality of wedge segments each having an inner surface tapered to correspond with the first plurality of tapered outer surfaces. The wedge clutch includes a second wedge plate radially between the second plurality of tapered outer surfaces and the outer race, the second wedge plate having a plurality of wedge segments each having an inner surface tapered to correspond with the second plurality of tapered outer surfaces. The wedge clutch includes a first actuator configured to radially expand or contract the first wedge plate to selectively lock rotation among the first inner race and the outer race in one rotational direction. The wedge clutch has a second actuator configured to radially expand or contract the second wedge plate to selectively lock rotation among the second inner race and the outer race in a second rotational direction.

According to another embodiment, a wedge clutch includes a first race, a second race, a first wedge plate, and a second wedge plate. The first wedge plate is disposed radially between the first race and the second race, and is configured to selectively expand and contract to selectively lock rotation between the first race and the second race in a first rotational direction while allowing rotation between the first race and the second race in a second rotational direction. The second wedge plate is disposed radially between the first race and the second race, the second wedge plate configured to selectively expand and contract to selectively lock rotation between the first race and the second race in the second rotational direction while allowing rotation between the first race and the second race in the first rotational direction.

According to yet another embodiment, a clutch includes an inner race extending about an axis and having an inner surface and an outer surface, the outer surface having a plurality of tapered regions such that a first portion of each tapered region is radially outward of a second portion of each tapered region. The clutch includes an outer race having an inner surface defining an annular groove. The clutch includes a wedge plate located radially between the outer surface of the inner race and the groove of the outer race. The wedge plate has a plurality of wedge segments each having a tapered inner surface engaging one of the tapered regions of the inner race. The wedge plate further defines an air gap between two end portions of the wedge plate such that the wedge plate is not continuous circumferentially about the axis. The wedge plate includes an electromagnetic actuator configured to, when energized, pull the two end portions of the wedge plate together to constrict the wedge plate. The energizing of the electromagnetic actuator slides the tapered inner surfaces of the wedge plate along the tapered regions of the inner race to move the wedge plate from a first position in which the wedge plate inhibits the inner race from rotating relative to the outer race in a first direction, to a second position in which the wedge plate enables the inner race to rotate relative to the outer race in the first direction

DETAILED DESCRIPTION

Figure 1:
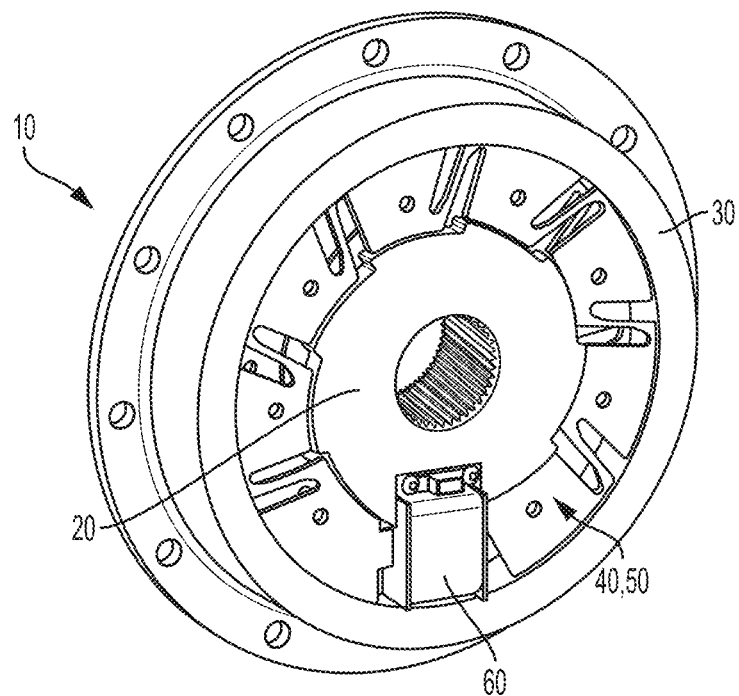
FIG. 1 is a perspective view of a wedge clutch according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology is used in the following description for convenience only and is not limiting. The words "front," "rear," "upper," "lower" designate directions in the drawings to which reference is made. The words "inwardly" and "outwardly" can refer to directions toward and away from the parts referenced in the drawings. The terms "inner" and "outer" can refer to locations toward and away from the central axis of the referenced component. "Axially" refers to a direction along the axis of a shaft or rotating part. "Radial" refers to a direction along a radial axis extending outward from the axis of the shaft or rotating part. The terminology includes the words specifically noted above, derivatives thereof and words of similar import.

Referring to FIG. 1, an assembled wedge clutch 10 is illustrated according to one embodiment. The wedge clutch 10 can be assembled to two rotatable components, and the wedge clutch 10 can be operated to selectively allow rotation between those components. As will be further described below, the wedge clutch 10 can operate as a one-way clutch in two different directions. In other words, the wedge clutch 10 can lock rotation between an input and an output in both rotational directions, lock rotation in a first direction while allowing freewheeling in a second direction, lock rotation in the second direction while allowing freewheeling in the first direction, and allow freewheel in both directions.

Figure 2:
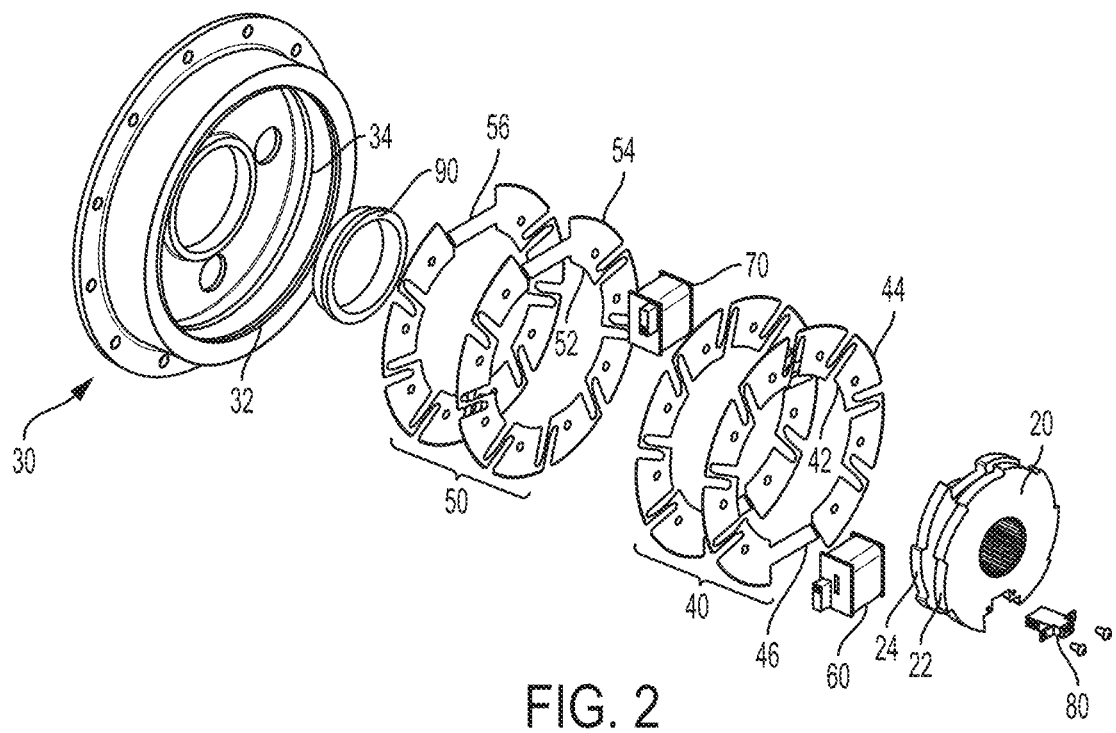
FIG. 2 is an exploded perspective view of the wedge clutch of FIG. 1, according to an embodiment.

FIG. 2 shows the wedge clutch 10 in an exploded view. Referring to FIGS. 1 and 2, the wedge clutch 10 includes the following components that will be described in further detail with respect to the remaining figures. An inner race 20 is configured to attach to a central shaft (not shown) with a suitable connection, such as a spline connection as shown. The inner race 20 can act as the output of the wedge clutch 10, selectively transferring rotation to the central shaft. An outer race 30 is configured to attach to another rotatable component, such as a shaft. The outer race 30 can act as the input to the wedge clutch 10, transferring rotational energy into (and through) the wedge clutch 10. A first pair of wedge plates 40 and a second pair of wedge plates 50 are located radially between the inner race 20 and outer race 30. The pairs of wedge plates 40, 50 are configured to selectively expand and contract to selectively lock or allow rotation between the inner race 20 and the outer race 30. Each pair of wedge plates 40, 50 is provided with its own respective coil 60, 70, configured to electrically energize to cause contraction of its respective pair of wedge plates 40, 50. In another embodiment, the coils are redesigned relative to the wedge plates to cause expansion of the wedge plates when the coils are energized. Electrical connections 80 are provided to selectively energize the coils 60, 70. A bushing 90 fits on the inner race 20 to center the outer race 30 and the inner race 20.

Figure 3:
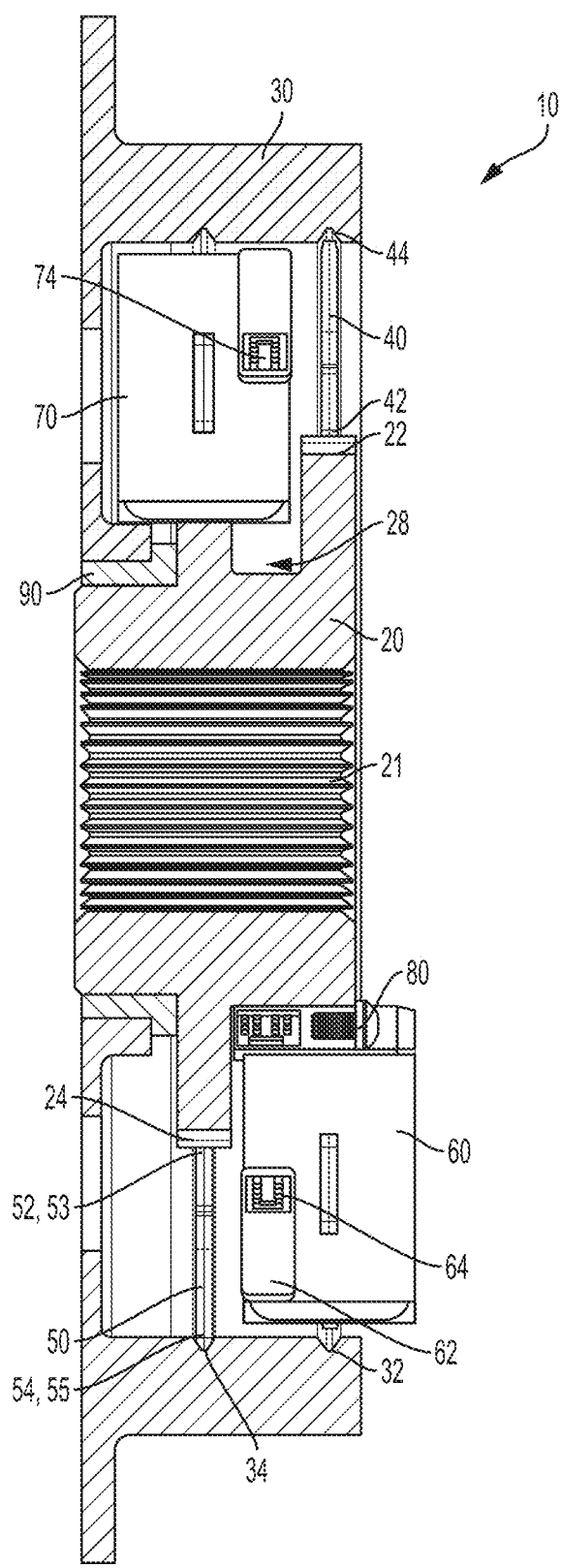
FIG. 3 is cross-sectional view of the wedge clutch of FIG. 1, according to an embodiment.
Figure 4:
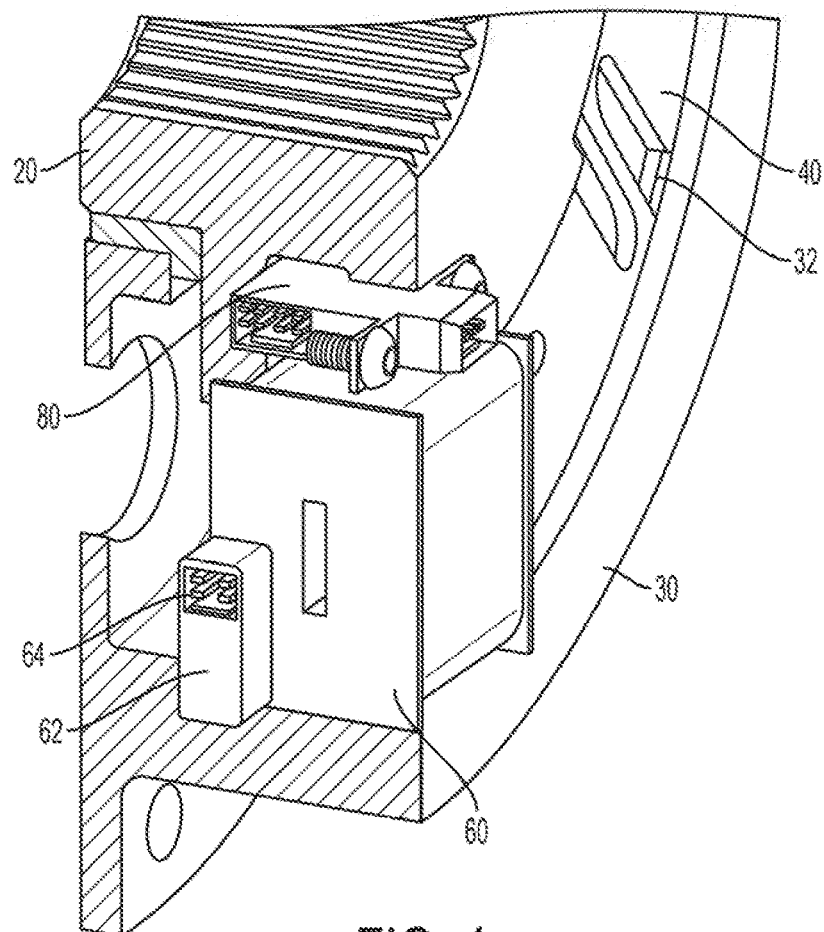
FIG. 4 is a partial cross-sectional view of a portion of the wedge clutch of FIG. 1, shown in perspective view, according to an embodiment.
Figure 5:
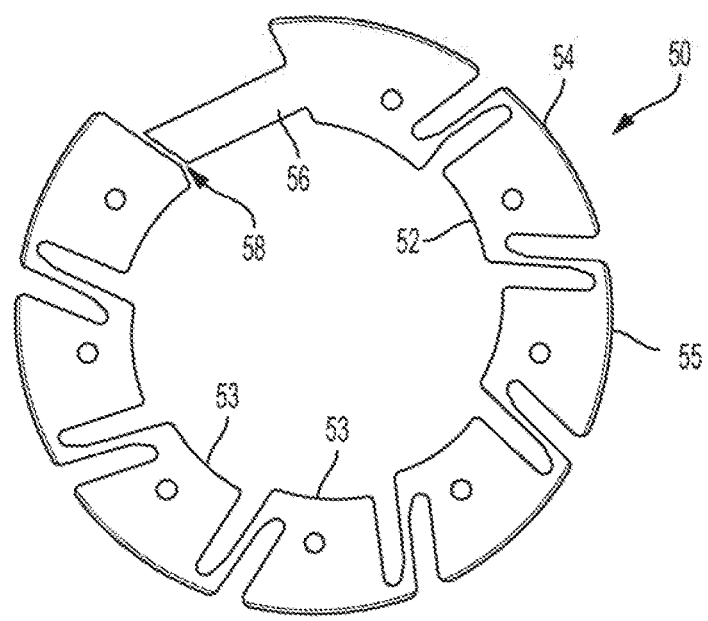
FIG. 5 is a front plan view of a wedge plate of the wedge clutch, according to an embodiment.
Figure 6A:
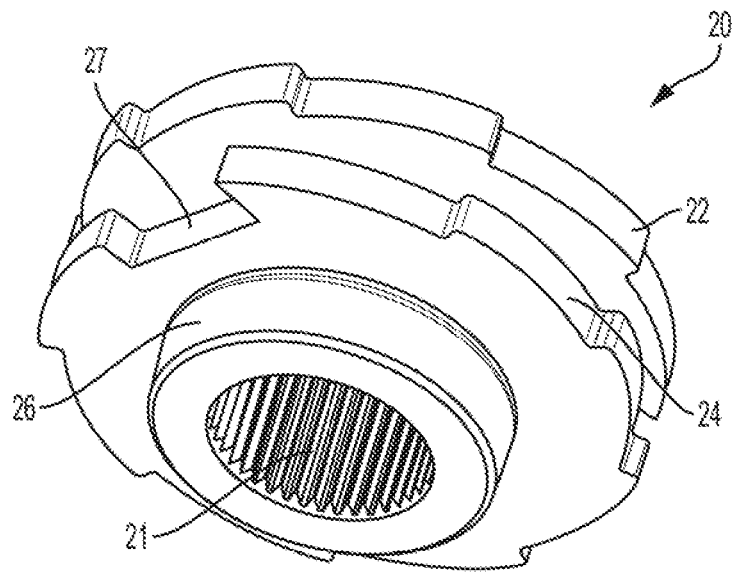
FIG. 6A is a perspective view of an inner race of the wedge clutch from one side.
Figure 6B:
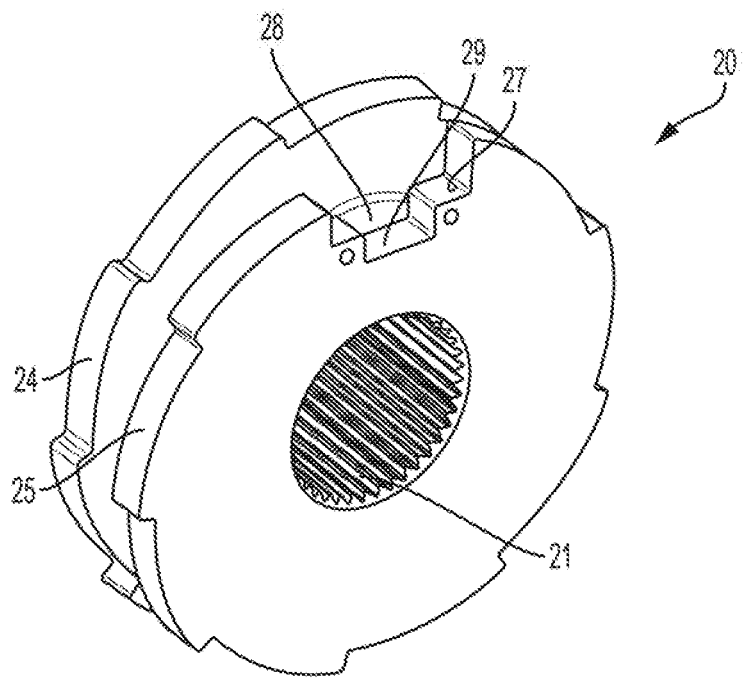
FIG. 6B is a perspective view of another size of the inner race of the wedge clutch, according to one embodiment.
Figure 7:
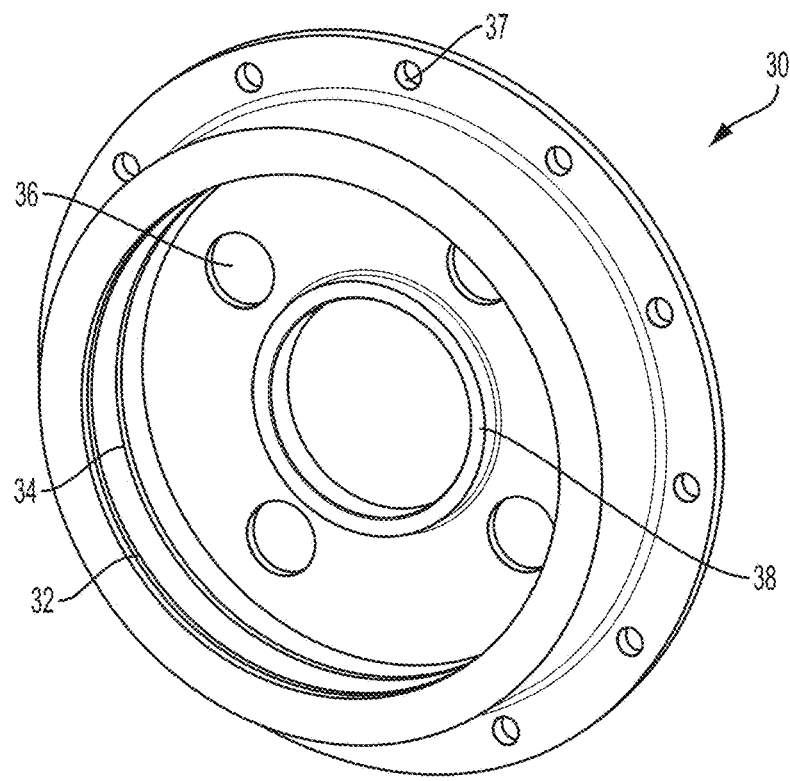
FIG. 7 is a perspective view of an outer race of the wedge clutch, according to one embodiment.

FIG. 3 illustrates a cross-sectional view of the assembled wedge clutch 10. FIG. 4 illustrates a perspective view of a portion of the wedge clutch, highlighting one of the coils 70 and the electrical connections. FIGS. 5, 6 and 7 show one of the wedge plates 40, the inner race 20, and the outer race 30, respectively. The structure and function of the wedge clutch 10 will now be described in view of FIGS. 1-4, along with the specific components shown individually in FIGS. 5-7.

The inner race 20 includes an inner surface 21 that is connected to the central shaft. The inner surface 21 can have spline features to enable a spline connection, for example. The inner race also has an outer surface that contacts the wedge plates 40, 50. The outer surface includes a first plurality of ramped surfaces 22, and a second plurality of ramped surfaces 24. The ramped surfaces 22, 24 are circumferentially arranged about the perimeter of the inner race 20. The ramped surfaces 22, 24 are ramped, sloped, or tapered such that the outer surface is not cylindrical; each ramped surface varies in radial distance from the central axis. In particular, each of the first ramped surfaces 22 is ramped in a first circumferential direction such that each ramped surface 22 slopes radially inward in the clockwise direction shown in FIG. 6B. Each of the second ramped surfaces 24 is ramped in a second, opposite circumferential direction such that each ramped surface 24 slopes radially inward in the counter-clockwise direction shown in FIG. 6B. Thus, it can be said that the first plurality of ramped surfaces 22 are ramped or tapered in a first circumferential direction, while the second plurality of ramped surfaces 24 are ramped or tapered in a second, opposite circumferential direction.

The first plurality of ramped surfaces 22 and the second plurality of ramped surfaces 24 can be said to create two separate inner races, with a first inner race formed by the first ramped surfaces 22 and a second inner race formed by the second ramped surfaces 24. While the inner race 20 is shown as a single component, in other embodiments the inner race is split such that one component (e.g., a plate) has the first ramped surfaces 22, and another separate component has the second ramped surfaces 24. The ramped surfaces 22, 24 need not be formed on the same inner race 20, and the illustration shown in FIGS. 6A-6B is but one embodiment in which a single component (i.e., inner race 20) includes both ramped surfaces 22, 24.

The inner race 20 also includes a cylindrical boss 26 with an outer surface configured to engage with the bushing 90. The boss 26 extends axially from the second plurality of ramped surfaces 24. The boss 26 can also share the same common inner surface 21 with spline connections.

The inner race 20 may define a void or pocket 27 located circumferentially along each of the plurality of ramped surfaces 22, 24. In one embodiment, each set of ramped surfaces 22, 24 has a missing ramped surface that is replaced by the pocket 27. The pocket 27 is radially inboard from the remainder of its respective set of ramped surfaces 22, 24. Each pocket 27 provides a coil retention feature that positions one of the coils 60, 70 and provides clearance for the coil after assembly.

Axially between the first and second plurality of ramped surfaces 22, 24 is a pocket or groove 28 where wires form the coils 60, 70 can be run and attached to the electrical connector 80. The pocket or groove 28 can be formed by a cylindrical surface radially inward from both of the first and second plurality of ramped surfaces 22, 24. Also, the inner race 20 defines an egress or secondary pocket 29 extending radially inward from one of the pockets 28. The secondary pocket 29 provides a location to mount the electrical connector 80. The electrical connector 80 can take a cable from each coil and has a 90-degree turn to face the radial outer direction of the assembly, as shown in FIG. 4. This provides a point to plug in the wires from an external component, such as a controller.

A plurality of wedge plates are disposed radially between the inner race 20 and the outer race 30. In the illustrated embodiment, four wedge plates are provided, namely two separate pairs of wedge plates 40, 50. More or less than four wedge plates may be utilized. In another embodiment, two wedge plates are provided, one for locking the clutch in one direction, and one for locking the clutch in the other direction. Therefore, each pair of wedge plate 40, 50 can each also be referred to as a wedge plate 40, 50, wherein each wedge plate 40, 50 is formed by joining two mirrored wedge plates as shown in FIG. 3 for example.

The first wedge plate 40 has a plurality of wedge segments, each collectively forming an inner surface 42 and an outer surface 44 of the wedge plate 40. The inner surface 42 has a plurality of inner surface segments that each rest on a respective one of the ramped surfaces 22 of the inner race. Each tapered surface can be tapered to match the angle of the ramped surfaces 22 such that a majority or entirety of the tapered surfaces rest on a respective one of the ramped surfaces.

The outer surface 44 of the first wedge plate 40 includes a plurality of outer surface segments, one for each wedge segment. The outer surface segments collectively define a circumference of the first wedge plate 40, i.e., the outer surface 44. The outer race 30 has a first circumferential groove 32 that receives the outer surface 44 of the first wedge plate 40.

The second wedge plate 50, shown in isolation in FIG. 5 according to one embodiment, has similar features as the first wedge plate 40, except the tapers of the inner surface segments are in the opposite circumferential direction. In particular, the second wedge plate 50 has a plurality of wedge segments each having inner surface segments 53 collectively defining an inner surface 52. Each inner surface segment 53 rests on a respective one of the ramped surfaces 24 of the inner race. The outer surface 54 of the second wedge plate includes a plurality of outer surface segments 55 that collectively define a circumference of the second wedge plate 50, i.e., the outer surface 54. The outer race 30 has a second circumferential groove 34 that receives the outer surface 54 of the second wedge plate 50. The second circumferential groove 34 may be axially spaced from the first groove 32 to accommodate for the axial spacing between the first and second wedge plates 40, 50.

To lock the first wedge plate 40, relative rotational movement is provided between the first wedge plate 40 and the inner race 20 to cause the inner surface segments to travel up (e.g., radially outward) along the ramped surfaces 22. This "wedges" the wedge segments of the first wedge plate radially between the ramped surfaces 22 and the outer race 30, thereby locking rotation between and amongst the inner race 20, the first wedge plate 40, and the outer race 30. Likewise, to lock the second wedge plate 50, relative rotational movement is provided between the second wedge plate 40 and the inner race 20 to cause the inner surface segments 53 to travel up (radially outward) along the ramped surfaces 24 in an opposite direction than the relative rotation of the first wedge plate 40.

To perform the relative rotational movement between the wedge plates 40, 50 and the inner race 20, actuators such as coils 60, 70 are provided, with one set of coils 60 for the first wedge plate 40 and another set of coils 70 for the second wedge plate 50. To accommodate and locate the coils, each wedge plate 40, 50 is provided with a respective coil core feature 46, 56. Taking one of the wedge plates 40 illustrated in FIG. 5 for example, the coil core feature 46 is a bar or flange that extends from one wedge segment to another, and is located circumferentially where one of the wedge segments would otherwise be. The coils can be wrapped around the coil core feature 46. A void or air gap, is defined between an end surface of the coil core feature 46 and one of the wedge segments. The coil core features 46, 56 may be circumferentially offset from one another to circumferentially offset the respective coils 60, 70.

The coils 60, 70 may be energized via a controller (not shown) that can be electrically connected via wires to the electrical connector 80. The electrical connector 80 is electrically connected to the coils 60, which can be electrically connected to the other set of coils 70 by, for example, wires that connect to respective coil bobbins, such as coil bobbin 62 shown in FIG. 4. The example shown in FIG. 4 shows the coil bobbin 62 having four pins on its plug feature 64—two for supply and ground wires to the coil windings, and two for optional coil temperature measurement. The two coils 60, 70 can be oriented such that their respective plugs 64, 74 are axially aligned with and positioned in the pocket 28 between the inner race ramped surfaces 22, 24, so that the coil wires can be easily run to the electrical connector 80.

Figure 8:
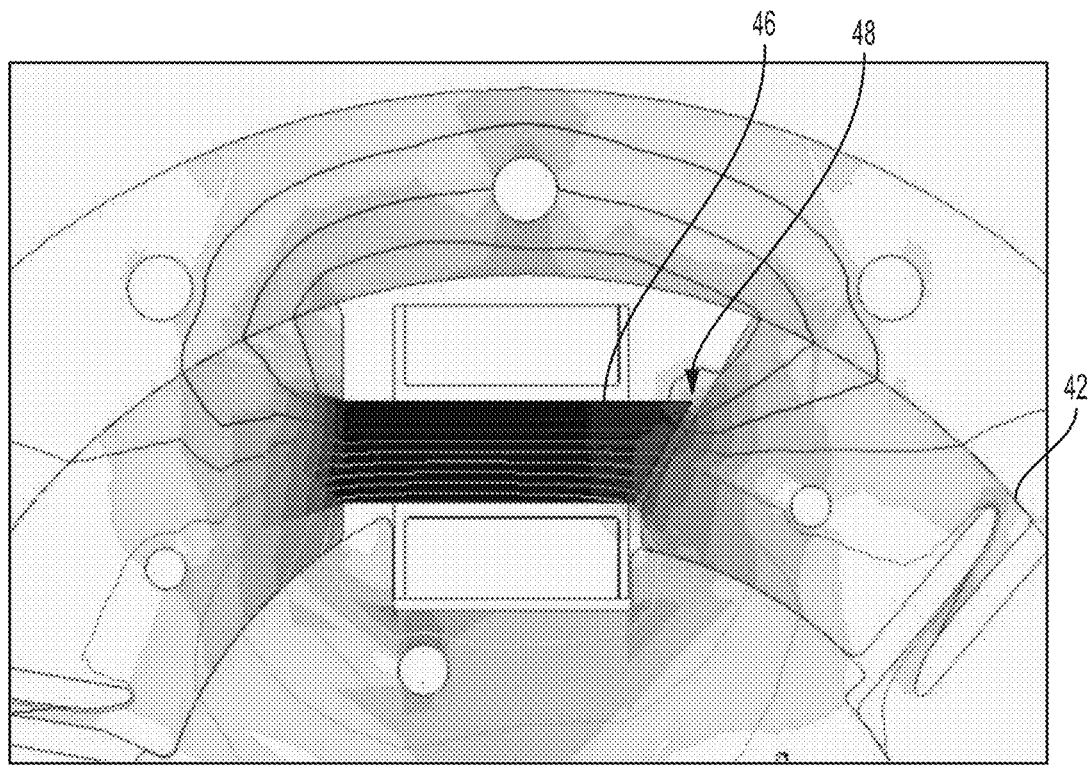
FIG. 8 is a plan view of one wedge plate showing magnetic flux across the wedge plate when an electromagnetic actuator of that wedge plate is actuated, according to one embodiment.

The wedge plates may be biased to be in their radially-expanded position in which they are wedged between the inner race and outer race to transmit torque therebetween. When power is sent to a coil from the controller, a magnetic field is set up in the coil core element of the wedge plates, which turns the wedge plate into an electromagnet. This is shown in FIG. 8, according to one embodiment. Magnetic flux bridges the air gap between the coil core and the adjacent wedge segment, which causes an attractive force that constricts the wedge plate, sliding the wedge plates along the ramped surfaces of the inner race and "unwedging" the wedged engagement between the inner race, the outer race, and the wedge plate.

For example, the first wedge plate 40 is initially biased in an expanded position so that the air gap is at its maximum size, and inner surface segments are each at their highest point along the corresponding ramped surfaces 22. This wedges and locks the inner race 20 to the outer race 30 in one rotational direction (e.g., counter-clockwise rotation of the outer race 30 causes corresponding counter-clockwise rotation of the inner race 20 in the orientation shown in FIGS. 1-2), while allowing freewheeling between the outer race 30 and the inner race 20 in the other rotational direction (e.g., clockwise). When the coils 60 are energized, the first wedge plate 40 contracts radially inwardly, closing the air gap and sliding the inner surface segments radially inwardly along the ramped surfaces 22. Assuming there is little to no torque on the wedge plate 40, this unwedges the outer race 30 from the inner race 20, and allows freewheeling in both direction while the coils are energized. When the coil is energized while the wedge plates are either at zero torque or rotating in the normally-freewheeling direction, the wedge plates will remain freewheeling when the torque direction changes to the normally-locked direction. If the plates are already locked up and carrying torque, energizing of the coil may not unwedge the outer race 30 from the inner race 20 until the torque has gone to zero or changed directions.

This same function can be provided in the second wedge plate 50 and the second coils 70 to selectively lock the outer race 30 to the inner race 20 in an opposite direction as the first wedge plate 40. In other words, energizing the coils 60 can unlock the wedge clutch 10 via removing the wedging between the ramped surfaces 22 of the inner race 20 and the groove 32 of the outer race 30; thus the first wedge plate 40 does not prevent freewheeling in both directions. Likewise, energizing the coils 70 can unlock the wedge clutch 10 via removing the wedging between the ramped surfaces 24 of the inner race 20 and the groove 34 of the outer race 30; thus the second wedge plate 50 does not prevent freewheeling in both directions. When both coils 60, 70 are energized, the wedge clutch 10 is capable of freewheeling in both directions. When one of the coils is de-energized, the wedge clutch 10 is locked in one respective rotational direction. When both of the coils are de-energized, the wedge clutch 10 is locked in both rotational directions.

The wedge clutch 10 can be cooled by lubricant. In one embodiment, the outer race 30 is provided with a plurality of flow holes 36 allowing cooling oil to flow over the coils and keep the grooves 32, 34 lubricated. The outer race 30 also has an outer flange with a plurality of holes 37 configured to receive a fastener (e.g., bolt) to mount the wedge clutch 10 to a housing, rotatable shaft, or other external structure. The outer race 30 also has an inner flange or boss 38 that extends to the bushing 90 to center the outer race 30 to the inner race 20.

While the embodiments shown and described above show the inner race 20 having the ramped surfaces 22, 24, and the outer race 30 having the cylindrical grooves 32, 34, in another embodiment these features are reversed such that the outer race has the ramped surfaces and the inner race is cylindrical. This would require reversing the wedge plates such that its tapered or ramped surfaces are on the outer surface of the wedge plates rather than the inner surface.

Moreover, in another embodiment the expansion of the wedge plate can unlock (rather than lock) the wedge clutch rather than contraction. In yet another embodiment, the wedge plates can be biased in the unlocked position, and energizing the coils can lock the wedge clutch. These variations can occur according to routine redesign of the embodiment shown in the Figures of this disclosure by reversing direction of the slope of the tapered surfaces of the races and the wedge plates, placing the tapered surfaces on the outer race as opposed to the inner race, reversing the polarity of the magnetic field, etc.

The wedge clutch of the present disclosure can be implemented into several applications where it is desired to selectively transfer torque from one rotating shaft to another. And, the wedge clutch of this disclosure provides four modes of operation: locked in both rotational directions, locked rotation in a first rotational direction but freewheeling in a second direction (i.e., a one-way clutch in one direction), locked rotation in the second rotational but freewheeling in the first direction (i.e., a one-way clutch in another direction), and freewheeling in both directions. Furthermore, the wedge design allows for significant amounts of torque to be transferred through the wedge clutch, enabling the wedge clutch to be used in various industrial disconnect application.

In another embodiment, the wedge clutch provides two modes of operations instead of four. In that embodiment, similar structure would be utilized except that only one of the wedge plates 40, 50 would be provided instead of both. In one such embodiment, the wedge clutch is a wedge one-way clutch with one coil so that the wedge clutch can operate to lock rotation in one direction while allowing freewheeling in the other direction when the wedge clutch is wedged or locked. In another such embodiment, the wedge clutch has a single bidirectional wedge clutch and one coil to create a two-mode disconnect clutch in which the wedge clutch locks in both directions when wedged or locked, and allows freewheeling in both directions when unwedged or unlocked.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A wedge clutch comprising:
an inner race having a first plurality of tapered outer surfaces tapered in a first circumferential direction, and a second plurality of tapered outer surfaces tapered in a second circumferential direction;
an outer race;
a first wedge plate located radially between the first plurality of tapered outer surfaces and the outer race, the first wedge plate having a plurality of wedge segments each having an inner surface tapered to correspond with the first plurality of tapered outer surfaces, wherein the first wedge plate defines a gap extending radially therethrough;
a second wedge plate radially between the second plurality of tapered outer surfaces and the outer race, the second wedge plate having a plurality of wedge segments each having an inner surface tapered to correspond with the second plurality of tapered outer surfaces;
a first actuator configured to radially expand or contract the first wedge plate by enlarging or reducing a size of the gap to selectively lock rotation among the inner race and the outer race in one rotational direction, wherein the first actuator includes coils that, when electrically energized, attract end portions of the first wedge plate to reduce the size of the gap and constrict the first wedge plat; and
a second actuator configured to radially expand or contract the second wedge plate to selectively lock rotation among the inner race and the outer race in a second rotational direction.

2. The wedge clutch of claim 1, wherein the outer race has an inner surface defining first and second annular grooves each configured to engage one of the first and second wedge plates.

3. The wedge clutch of claim 1, wherein the inner race is a single integral component such that the first and second plurality of tapered outer surfaces are defined on the single integral component.

4. The wedge clutch of claim 1, wherein the inner race defines a cylindrical surface axially between first and second plurality of tapered outer surfaces.

5. The wedge clutch of claim 4, wherein the first and second actuators each include an electric plug axially aligned with each other and with the cylindrical surface.

6. A wedge clutch comprising:
a first race;
a second race;
a first wedge plate disposed radially between the first race and the second race, the first wedge plate configured to selectively expand and contract to selectively lock rotation between the first race and the second race in a first rotational direction while allowing rotation between the first race and the second race in a second rotational direction, wherein the first wedge plate defines a first gap extending radially therethrough such that the first wedge plate is not continuous in a circumferential direction, and wherein the first wedge plate defines a first flange adjacent to the first gap;
a second wedge plate disposed radially between the first race and the second race, the second wedge plate configured to selectively expand and contract to selectively lock rotation between the first race and the second race in the second rotational direction while allowing rotation between the first race and the second race in the first rotational direction; wherein the second wedge plate defines a second gap extending radially therethrough such that the second wedge plate is not continuous in the circumferential direction, and wherein the second wedge plate defines a second flange adjacent to the second gap;
a first set of coils provided on the first flange and configured to, when energized, shrink the first gap to constrict the first wedge plate;
a second set of coils provided on the second flange and configured to, when energized, shrink the second gap to constrict the second wedge plate.

7. The wedge clutch of claim 6, wherein the first and second wedges plate are each biased in an expanded position to lock the first race to the second race in the first and second rotational directions, respectively.

8. The wedge clutch of claim 6, wherein the first race is an inner race that includes a first plurality of tapered outer surfaces tapered in a first circumferential direction and engaged with the first wedge plate, and a second plurality of tapered outer surfaces tapered in a second circumferential direction and engaged with the second wedge plate.

9. The wedge clutch of claim 8, further comprising
a first electromagnetic actuator that includes the first set of coils and is configured to, when energized, constrict the first wedge plate along the first plurality of tapered outer surfaces to enable rotation in the first rotational direction, and
a second electromagnetic actuator that includes the second set of coils and is configured to, when energized, constrict the second wedge plate along the second plurality of tapered outer surfaces to enable rotation in the second rotational direction.

10. A clutch comprising:
an inner race extending about an axis and having an inner surface and an outer surface, the outer surface having a plurality of tapered regions such that a first portion of each tapered region is radially outward of a second portion of each tapered region;
an outer race having an inner surface defining an annular groove;
a wedge plate located radially between the outer surface of the inner race and the groove of the outer race, the wedge plate having a plurality of wedge segments each having a tapered inner surface engaging one of the tapered regions of the inner race, the wedge plate further defining an air gap between two end portions of the wedge plate such that the wedge plate is not continuous circumferentially about the axis; and
an electromagnetic actuator configured to, when energized, pull the two end portions of the wedge plate together to constrict the wedge plate;
wherein the energizing of the electromagnetic actuator slides the tapered inner surfaces of the wedge plate along the tapered regions of the inner race to move the wedge plate from
a first position in which the wedge plate inhibits the inner race from rotating relative to the outer race in a first direction, to
a second position in which the wedge plate enables the inner race to rotate relative to the outer race in the first direction.

11. The clutch of claim 10, wherein the wedge plate defines a linear portion adjacent the air gap, and the electromagnet actuator includes coils wrapped around a linear portion.

12. The clutch of claim 10, wherein the inner race defines a pocket axially aligned with the tapered regions and extending radially inward from the tapered regions, wherein at least a portion of the electromagnetic actuator is located in the pocket.

13. The clutch of claim 10, wherein the inner race defines a second plurality of tapered regions tapered in a circumferentially-opposite direction than the plurality of tapered regions.

14. The clutch of claim 13, further comprising a second wedge plate located radially between the second plurality of tapered regions and the inner surface of the outer race, wherein the second wedge plate having a second plurality of wedge segments each having a tapered inner surface engaging one of the second plurality of tapered regions.

15. The clutch of claim 14, further comprising a second electromagnetic actuator configured to, when energized, slide the tapered inner surfaces of the second wedge plate along the second plurality of tapered regions of the inner race to move the second wedge plate from
a first position in which the wedge plate inhibits the inner race from rotating relative to the outer race in a second direction opposite the first direction, to
a second position in which the wedge plate enables the inner race to rotate relative to the outer race in the second direction.

16. The clutch of claim 13, wherein the plurality of tapered regions and the second plurality of tapered regions are axially spaced apart.

* * * * *